UNITED STATES PATENT OFFICE.

WILLIAM L. EATON, OF NEW YORK, N. Y.

INSECTICIDE.

SPECIFICATION forming part of Letters Patent No. 626,890, dated June 13, 1899.

Application filed November 25, 1898. Serial No. 697,476. (No specimens.)

*To all whom it may concern:*

Be it known that I, WILLIAM L. EATON, a citizen of the United States, residing at the city of New York, in the county of New York and State of New York, have invented certain new and useful Improvements in Insecticides and Disinfectants; and I do declare the following to be a full, clear, and exact description of the invention, such as will enable others skilled in the art to which it appertains to make and use the same.

My invention consists of a composition containing the following ingredients combined in the proportions stated: carbolic acid, six and three-eighths gallons; naphtha, three gallons; essence of peppermint, five-eighths of a gallon; gum-camphor, eighty ounces; Cayenne pepper, twenty ounces, making a total of ten gallons.

While this composition may be applied with a brush, it is preferably used with an atomizer.

The ingredients when mixed should be thoroughly shaken before application.

What I claim, and desire to secure by Letters Patent of the United States, is—

The herein-described composition of matter to be used as an insecticide or disinfectant, consisting of carbolic acid six and three-eighths gallons, naphtha three gallons, essence of peppermint five-eighths of a gallon, gum-camphor eighty ounces and Cayenne pepper twenty ounces, substantially as described.

In testimony whereof I affix my signature in the presence of two witnesses.

WILLIAM L. EATON.

Witnesses:
HENRY L. WASHBURN,
NATHAN B. MEDBERY.